United States Patent
Medas et al.

(10) Patent No.: US 10,686,681 B2
(45) Date of Patent: Jun. 16, 2020

(54) SYSTEMS AND METHODS FOR MEASURING EFFECTIVE CUSTOMER IMPACT OF NETWORK PROBLEMS IN REAL-TIME USING STREAMING ANALYTICS

(71) Applicant: ANRITSU COMPANY, Morgan Hill, CA (US)

(72) Inventors: Carlo Medas, Rome (IT); Davide Motta, Rome (IT)

(73) Assignee: ANRITSU COMPANY, Morgan Hill, CA (US)

(*) Notice: Subject to any disclaimer, the term of this patent is extended or adjusted under 35 U.S.C. 154(b) by 47 days.

(21) Appl. No.: 15/470,716

(22) Filed: Mar. 27, 2017

(65) Prior Publication Data

US 2017/0295078 A1 Oct. 12, 2017

Related U.S. Application Data

(60) Provisional application No. 62/314,806, filed on Mar. 29, 2016.

(51) Int. Cl.
| | |
|---|---|
| *H04L 12/26* | (2006.01) |
| *H04L 12/24* | (2006.01) |
| *H04L 12/801* | (2013.01) |

(52) U.S. Cl.
CPC .......... *H04L 43/08* (2013.01); *H04L 41/0681* (2013.01); *H04L 41/0686* (2013.01);
(Continued)

(58) Field of Classification Search
CPC ..... H04L 43/12; H04L 41/12; H04L 43/0811; H04L 43/0876; G06F 15/16; G06F 19/18; G06F 19/20
(Continued)

(56) References Cited

U.S. PATENT DOCUMENTS 5,742,814 A * 4/1998 Balasa ................. G06F 9/5016
5,801,525 A 9/1998 Oldfield
(Continued)

FOREIGN PATENT DOCUMENTS

| | | |
|---|---|---|
| WO | 2013016244 | 1/2013 |
| WO | 2015077385 | 5/2015 |

OTHER PUBLICATIONS

Notification of Transmittal of the International Search Report and the Written Opinion of the International Searching Authority issued for PCT/US2017/024158, dated May 24, 2017, 8 pages.
(Continued)

*Primary Examiner* — Tesfay Yohannes
(74) *Attorney, Agent, or Firm* — Tucker Ellis LLP (57) ABSTRACT

A system used for identifying issues within a telecom network. Data is obtained from sources including probes and network elements. KPIs are identified for real-time streaming aggregation. Streaming data related to the KPIs is aggregated and an approximation of count-distinct subscribers and volume count is calculated, as well as count-distinct subscribers aggregating by each identified KPI. Drill objects found in the aggregated data are identified based on the calculations and real-time trending records are generated and stored for each drill object using an exponential moving average. Baseline averages are generated based on the real-time trending records. An increase in errors can then be detected based on the baseline averages and additionally aggregated real-time streaming data. Deviations in each drill object contributing to the detected increase in errors are then analyzed and a full case report is generated based on details of the deviations.

24 Claims, 7 Drawing Sheets

(52) U.S. Cl.
CPC ............ *H04L 41/142* (2013.01); *H04L 41/50* (2013.01); *H04L 41/5009* (2013.01); *H04L 43/04* (2013.01); *H04L 43/0847* (2013.01); *H04L 43/12* (2013.01); *H04L 41/5003* (2013.01); *H04L 41/509* (2013.01); *H04L 41/5016* (2013.01); *H04L 43/045* (2013.01); *H04L 47/115* (2013.01)

(58) Field of Classification Search
USPC .......................................... 709/224; 370/252
See application file for complete search history.

(56) References Cited

U.S. PATENT DOCUMENTS

| | | | |
|---|---|---|---|
| 5,812,039 A | 9/1998 | Oldfield | |
| 5,909,192 A | 6/1999 | Finch | |
| 5,977,779 A | 11/1999 | Bradley | |
| 6,049,212 A | 4/2000 | Oldfield | |
| 6,291,984 B1 | 9/2001 | Wong | |
| 6,316,945 B1 | 11/2001 | Kapetanic | |
| 6,331,769 B1 | 12/2001 | Wong | |
| 6,496,353 B1 | 12/2002 | Chio | |
| 6,504,449 B2 | 1/2003 | Constantine | |
| 6,509,821 B2 | 1/2003 | Oldfield | |
| 6,525,631 B1 | 2/2003 | Oldfield | |
| 6,529,844 B1 | 3/2003 | Kapetanic | |
| 6,548,999 B2 | 4/2003 | Wong | |
| 6,650,123 B2 | 11/2003 | Martens | |
| 6,665,628 B2 | 12/2003 | Martens | |
| 6,670,796 B2 | 12/2003 | Mori | |
| 6,680,679 B2 | 1/2004 | Stickle | |
| 6,700,366 B2 | 3/2004 | Truesdale | |
| 6,700,531 B2 | 3/2004 | Abou-Jaoude | |
| 6,714,898 B1 | 3/2004 | Kapetanic | |
| 6,766,262 B2 | 7/2004 | Martens | |
| 6,832,170 B2 | 12/2004 | Martens | |
| 6,839,030 B2 | 1/2005 | Noujeim | |
| 6,882,160 B2 | 4/2005 | Martens | |
| 6,888,342 B2 | 5/2005 | Bradley | |
| 6,894,581 B2 | 5/2005 | Noujeim | |
| 6,917,892 B2 | 7/2005 | Bradley | |
| 6,928,373 B2 | 8/2005 | Martens | |
| 6,943,563 B2 | 9/2005 | Martens | |
| 7,002,517 B2 | 2/2006 | Noujeim | |
| 7,011,529 B2 | 3/2006 | Oldfield | |
| 7,016,024 B2 | 3/2006 | Bridge | |
| 7,019,510 B1 | 3/2006 | Bradley | |
| 7,054,776 B2 | 5/2006 | Bradley | |
| 7,068,046 B2 | 6/2006 | Martens | |
| 7,088,111 B2 | 8/2006 | Noujeim | |
| 7,108,527 B2 | 9/2006 | Oldfield | |
| 7,126,347 B1 | 10/2006 | Bradley | |
| 7,173,423 B2 | 2/2007 | Buchwald | |
| 7,284,141 B2 | 10/2007 | Stickle | |
| 7,304,469 B1 | 12/2007 | Bradley | |
| 7,307,493 B2 | 12/2007 | Feldman | |
| 7,509,107 B2 | 3/2009 | Bradley | |
| 7,511,577 B2 | 3/2009 | Bradley | |
| 7,521,939 B2 | 4/2009 | Bradley | |
| 7,545,151 B2 | 6/2009 | Martens | |
| 7,683,602 B2 | 3/2010 | Bradley | |
| 7,683,633 B2 | 3/2010 | Noujeim | |
| 7,705,582 B2 | 4/2010 | Noujeim | |
| 7,746,052 B2 | 6/2010 | Noujeim | |
| 7,764,141 B2 | 7/2010 | Noujeim | |
| 7,872,467 B2 | 1/2011 | Bradley | |
| 7,924,024 B2 | 4/2011 | Martens | |
| 7,957,462 B2 | 6/2011 | Aboujaoude | |
| 7,983,668 B2 | 7/2011 | Tiernan | |
| 8,027,390 B2 | 9/2011 | Noujeim | |
| 8,058,880 B2 | 11/2011 | Bradley | |
| 8,145,166 B2 | 3/2012 | Barber | |
| 8,156,167 B2 | 4/2012 | Bradley | |
| 8,159,208 B2 | 4/2012 | Brown | |
| 8,169,993 B2 | 5/2012 | Huang | |
| 8,185,078 B2 | 5/2012 | Martens | |
| 8,278,944 B1 | 10/2012 | Noujeim | |
| 8,294,469 B2 | 10/2012 | Bradley | |
| 8,305,115 B2 | 11/2012 | Bradley | |
| 8,306,134 B2 | 11/2012 | Martens | |
| 8,410,786 B1 | 4/2013 | Bradley | |
| 8,417,189 B2 | 4/2013 | Noujeim | |
| 8,457,187 B1 | 6/2013 | Aboujaoude | |
| 8,493,111 B1 | 7/2013 | Bradley | |
| 8,498,582 B1 | 7/2013 | Bradley | |
| 8,538,350 B2 | 9/2013 | Varjonen | |
| 8,593,158 B1 | 11/2013 | Bradley | |
| 8,629,671 B1 | 1/2014 | Bradley | |
| 8,630,591 B1 | 1/2014 | Martens | |
| 8,666,322 B1 | 3/2014 | Bradley | |
| 8,718,586 B2 | 5/2014 | Martens | |
| 8,760,148 B1 | 6/2014 | Bradley | |
| 8,816,672 B1 | 8/2014 | Bradley | |
| 8,816,673 B1 | 8/2014 | Barber | |
| 8,884,664 B1 | 11/2014 | Bradley | |
| 8,903,149 B1 | 12/2014 | Noujeim | |
| 8,903,324 B1 | 12/2014 | Bradley | |
| 8,942,109 B2 | 1/2015 | Dorenbosch | |
| 9,026,851 B2 | 5/2015 | Mondal | |
| 9,103,856 B2 | 8/2015 | Brown | |
| 9,103,873 B1 | 8/2015 | Martens | |
| 9,110,101 B2* | 8/2015 | Pietrowicz | G01R 1/20 |
| 9,153,890 B2 | 10/2015 | Warwick | |
| 9,176,174 B1 | 11/2015 | Bradley | |
| 9,176,180 B1 | 11/2015 | Bradley | |
| 9,210,598 B1 | 12/2015 | Bradley | |
| 9,239,371 B1 | 1/2016 | Bradley | |
| 9,287,604 B1 | 3/2016 | Noujeim | |
| 9,331,633 B1 | 5/2016 | Robertson | |
| 9,337,941 B2 | 5/2016 | Emerson | |
| 9,366,707 B1 | 6/2016 | Bradley | |
| 9,455,792 B1 | 9/2016 | Truesdale | |
| 9,560,537 B1 | 1/2017 | Lundquist | |
| 9,571,142 B2 | 2/2017 | Huang | |
| 9,588,212 B1 | 3/2017 | Bradley | |
| 9,594,370 B1 | 3/2017 | Bradley | |
| 9,606,212 B1 | 3/2017 | Martens | |
| 9,680,245 B1 | 6/2017 | Warwick | |
| 9,685,717 B2 | 6/2017 | Warwick | |
| 9,696,403 B1 | 7/2017 | Elder-Groebe | |
| 9,733,289 B1 | 8/2017 | Bradley | |
| 9,753,071 B1 | 9/2017 | Martens | |
| 9,768,892 B1 | 9/2017 | Bradley | |
| 9,853,867 B2 | 12/2017 | Baccarani | |
| 9,860,054 B1 | 1/2018 | Bradley | |
| 9,964,585 B1 | 5/2018 | Bradley | |
| 9,967,085 B1 | 5/2018 | Bradley | |
| 9,977,068 B1 | 5/2018 | Bradley | |
| 10,003,453 B1 | 6/2018 | Bradley | |
| 10,006,952 B1 | 6/2018 | Bradley | |
| 10,064,317 B1 | 8/2018 | Bradley | |
| 10,116,432 B1 | 10/2018 | Bradley | |
| 2004/0126840 A1* | 7/2004 | Cheng | H04L 29/06 435/69.1 |
| 2005/0266494 A1* | 12/2005 | Hodge | G06Q 30/00 435/6.12 |
| 2005/0287575 A1* | 12/2005 | Di | G16B 20/00 435/6.11 |
| 2006/0156363 A1* | 7/2006 | Wu | H04N 21/234327 725/113 |
| 2014/0068348 A1 | 3/2014 | Mondal | |
| 2015/0248462 A1 | 9/2015 | Theeten et al. | |
| 2015/0248680 A1 | 9/2015 | Chen et al. | |
| 2015/0347951 A1* | 12/2015 | Tamblyn | G06Q 30/0631 705/7.39 |
| 2015/0382210 A1 | 12/2015 | Kateley et al. | |
| 2016/0142931 A1* | 5/2016 | Mondal | H04W 24/08 370/252 |
| 2016/0171414 A1* | 6/2016 | Lee | G06Q 10/06393 705/7.39 |

(56) References Cited

U.S. PATENT DOCUMENTS

| | | | |
|---|---|---|---|
| 2016/0294658 A1* | 10/2016 | Fowler | H04L 43/0894 |
| 2016/0377457 A1* | 12/2016 | Zhang | G01D 9/32 |
| | | | 702/130 |
| 2017/0207990 A1* | 7/2017 | Curtin | H04L 43/028 |

OTHER PUBLICATIONS

European Patent Office, International Searching Authority, Extended European Search Report dated Oct. 15, 2019 for International Application No. PCT/US2017/024158, 10 Pages.

Akmal, M. et al., "An Enhanced Modulated Waveform Measurement System for the Robust Characterization of Microwave Devices under Modulated Excitation", Proceedings of the 6th European Microwave Integrated Circuits Conference, © 2011, Oct. 2011, Manchester, UK, pp. 180-183.

Cunha, Telmo R. et al., "Characterizing Power Amplifier Static AM/PM with Spectrum Analyzer Measurements", IEEE © 2014, 4 pages.

Fager, Christian et al., "Prediction of Smart Antenna Transmitter Characteristics Using a New Behavioral Modeling Approach" IEEE® 2014, 4 pages.

Fager, Christian et al., "Analysis of Nonlinear Distortion in Phased Array Transmitters" 2017 International Workshop on Integrated Nonlinear Microwave and Millmetre-Wave Circuits (INMMiC), Apr. 20-21, 2017, Graz, Austria, 4 pages.

Martens, J. et al., "Towards Faster, Swept, Time-Coherent Transient Network Analyzer Measurements" 86th ARFTG Conf. Dig., Dec. 2015, 4 pages.

Martens, J., "Match correction and linearity effects on wide-bandwidth modulated AM-AM and AM-PM measurements" 2016 EuMW Conf. Dig., Oct. 2016, 4 pages.

Nopchinda, Dhecha et al., "Emulation of Array Coupling Influence on RF Power Amplifiers in a Measurement Setup", IEEE © 2016, 4 pages.

Pedro, Jose Carlos et al., "On the Use of Multitone Techniques for Assessing RF Components' Intermodulation Distortion", IEEE Transactions on Microwave Theory and Techniques, vol. 47, No. 12, Dec. 1999, pp. 2393-2402.

Ribeiro, Diogo C. et al., "D-Parameters: A Novel Framework for Characterization and Behavorial Modeling of Mixed-Signal Systems", IEEE Transactions on Microwave Theory and Techniques, vol. 63, No. 10, Oct. 2015, pp. 3277-3287.

Roblin, Patrick, "Nonlinear RF Circuits and Nonlinear Vector Network Analyzers; Interactive Measurement and Design Techniques", The Cambridge RF and Microwave Engineering Series, Cambridge University Press © 2011, entire book.

Rusek, Fredrik et al., "Scaling Up MIMO; Opportunities and challenges with very large arrays", IEEE Signal Processing Magazine, Jan. 2013, pp. 40-60.

Senic, Damir et al., "Estimating and Reducing Uncertainty in Reverberation-Chamber Characterization at Millimeter-Wave Frequencies", IEEE Transactions on Antennas and Propagation, vol. 64, No. 7, Jul. 2016, pp. 3130-3140.

Senic, Damir et al., "Radiated Power Based on Wave Parameters at Millimeter-wave Frequencies for Integrated Wireless Devices", IEEE © 2016, 4 pages.

\* cited by examiner

MAP / Outbound

At 16:28 there are 1148 users affected by MAP Error Code '34 System Failure'.
Issue has been happening for 31 minutes, affecting a total of 9372 users, and peak was 16:23 with 1198 affected users.
The issue was primarily related to the following causes:
- *Linkset Name:* 3_BRSTP1-ODSTP1 (59% ▲ 59%) 3_OGSTP2-ODSTP1 (57% ▲ 57%) 3_OGSTP2-OOSTP1 (29% ▲ 29%) 3_BRSTP1-OOSTP1 (25% ▲ 25%)
- *Originating Point Code:* NI3 1283 (69% ▲ 69%) NI3 1284 (48% ▲ 4%)
- *MAP Operation Code:* 56 sendAuthenticationInfo (100% ▲ 100%)

MAP / Outbound

At 16:28 there are 645 users affected by MAP Error Code '1 Unknown Subscriber'.
Issue has been happening for 31 minutes, affecting a total of 2634 users, and peak was 16:06 with 741 affected users.
The issue was primarily related to the following causes:
- *Linkset Name:* 3_OGSTP2-ODSTP1 (41% ▲ 41%) 3_BRSTP1-ODSTP1 (40% ▲ 40%) 3_OGSTP2-OOSTP1 (27% ▲ 27%) 3_BRSTP1-OOSTP1 (27% ▲ 27%)
- *Originating Point Code:* NI3 1283 (69% ▲ 69%) NI3 1284 (48% ▲ 4%)
- *MAP Operation Code:* 56 sendAuthenticationInfo (100% ▲ 100%)

FIG. 4

IUPS/Retainability

From 13:54 to 13:57 there have been 2376 users affected by Iu Release Cause '14 Failure in the Radio Interface Procedure'.

Peak was at 13:56 with 1711 (▲2.3x) affected users.

The issue was primarily related to the following causes:

- *Last RAI:* GERAN/UTRAN RAC: 801-1 (10% ▲ 6%) GERAN/UTRAN RAC: 501-1 (10% ▲ 6%) GERAN/UTRAN RAC: 201-1 (9% ▲ 6%) GERAN/UTRAN RAC: 801-1 (8% ▲ 4%) GERAN/UTRAN RAC: 601-1 (7% ▲ 4%)
- *Last Serving RNC:* 2  (9% ▲ 6%)  0  (9% ▲ 6%)  2  (9% ▲ 6%)  1  (8% ▲ 4%)  6  (7% ▲ 4%)

IUPS/Retainability

From 13:54 to 13:57 there have been 6351 users affected by Iu Release Cause '31 No remaining RAB'.

Peak was at 13:56 with 4487 (▲2.4x) affected users.

The issue was primarily related to the following causes:

- *Access Point Name:* tele  (20% ▲ 12%)  mart  (7% ▲ 4%)  apple  (5% ▲ 3%)
- *Last RAI:* GERAN/UTRAN RAC: 201-1 (8% ▲ 5%) GERAN/UTRAN RAC: 801-1 (8% ▲ 5%) GERAN/UTRAN RAC: 001-1 (7% ▲ 5%) GERAN/UTRAN RAC: 501-1 (7% ▲ 5%) GERAN/UTRAN RAC: 801-1 (7% ▲ 4%)
- *Last Serving RNC:* 18 (7% ▲ 4%)  20 (6% ▲ 4%)  02 (6% ▲ 4%)  05 (6% ▲ 4%)  8 (5% ▲ 3%)

SYSTEMS AND METHODS FOR MEASURING EFFECTIVE CUSTOMER IMPACT OF NETWORK PROBLEMS IN REAL-TIME USING STREAMING ANALYTICS

CLAIM OF PRIORITY

This application claims the benefit of priority to U.S. Provisional Patent Application No. 62/314,806, filed Mar. 29, 2016, and entitled "SYSTEMS AND METHODS FOR MEASURING EFFECTIVE CUSTOMER IMPACT OF NETWORK PROBLEMS IN REAL-TIME USING STREAMING ANALYTICS", by Carlo Medas, et al., which is incorporated herein by reference.

TECHNICAL FIELD

The present invention is generally related to systems and methods for measuring potential and/or actual customer impact resulting from problems in a telecommunication network.

BACKGROUND

Telecommunication network operators face a wide range of challenges to ensure continued relevance and profitability. Core revenues are threatened by over-the-top content (OTT) providers, with exploding data usage and heavily video-based network usage. Subscribers are constantly demanding more from services in terms of variety, capacity and commercial offerings. Telecommunication technology also continues to accelerate in complexity, leading to the need for new hardware investment. Subscriber base expansion in saturated markets is driven by innovation and superior customer experience.

Current state-of-the art telecommunication technologies such as the long-term evolution (LTE) wireless standard, converged heterogeneous networks, next-generation network (NGN) and network function virtualization (NFV) help reduce operational costs, but understanding customer experience in a competitive market can give a network operator a competitive advantage. Whatever the technology used by a network operator, customer satisfaction can depend on the ability to provide a desired level of service to a diverse and fragmenting customer base. From residential consumers to multinational corporations, customers want access to services wherever, whenever and at the best possible price.

Service uptime is directly linked to a network operator's revenue stream. If there is no service, there can be no chargeable events. However, quality of experience (QoE) can be equally relevant. QoE is linked to revenue, although in a less direct way. Degradation of QoE eventually leads to churn, and high QoE deterioration can discourage use of the service.

SUMMARY

A system and method can be used identify issues within a telecommunication (telecom) network. Data is obtained from a number of sources including probes and network elements. One or more key performance indicators (KPIs) are identified for real-time streaming aggregation. Streaming data related to the identified one or more KPIs is aggregated in real-time, and an approximation of count-distinct subscribers and volume count is calculated, as well as an approximation of count-distinct subscribers aggregating by each identified KPI.

One or more drill objects found in the aggregated data are identified based on the calculations and real-time trending records are generated and stored for each of the identified one or more drill objects using an exponential moving average. Baseline averages are generated based on the real-time trending records. An increase in errors can then be detected based on the baseline averages and additionally aggregated real-time streaming data.

Deviations in each drill object contributing to the detected increase in errors are then analyzed and a full case report is generated based on details of the deviations. The full case report is displayed in a user interface and one or more alarms are propagated related to the deviations. The full case report is updated by checking subsequent values of the one or more KPIs until the increase in errors is no longer detected. Recurrence detection and automatic case correlation is then performed on data related to the one or more KPIs for which the full case report was generated and updated.

BRIEF DESCRIPTION OF THE DRAWINGS

The following description is of the best modes presently contemplated for practicing various embodiments of the present invention. The description is not to be taken in a limiting sense but is made merely for the purpose of describing the general principles of the invention. The scope of the invention should be ascertained with reference to the claims. In the description of the invention that follows, like numerals or reference designators will be used to refer to like parts or elements throughout. In addition, the first digit of a reference number identifies the figure in which the part or element is first discussed.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Figure 1:
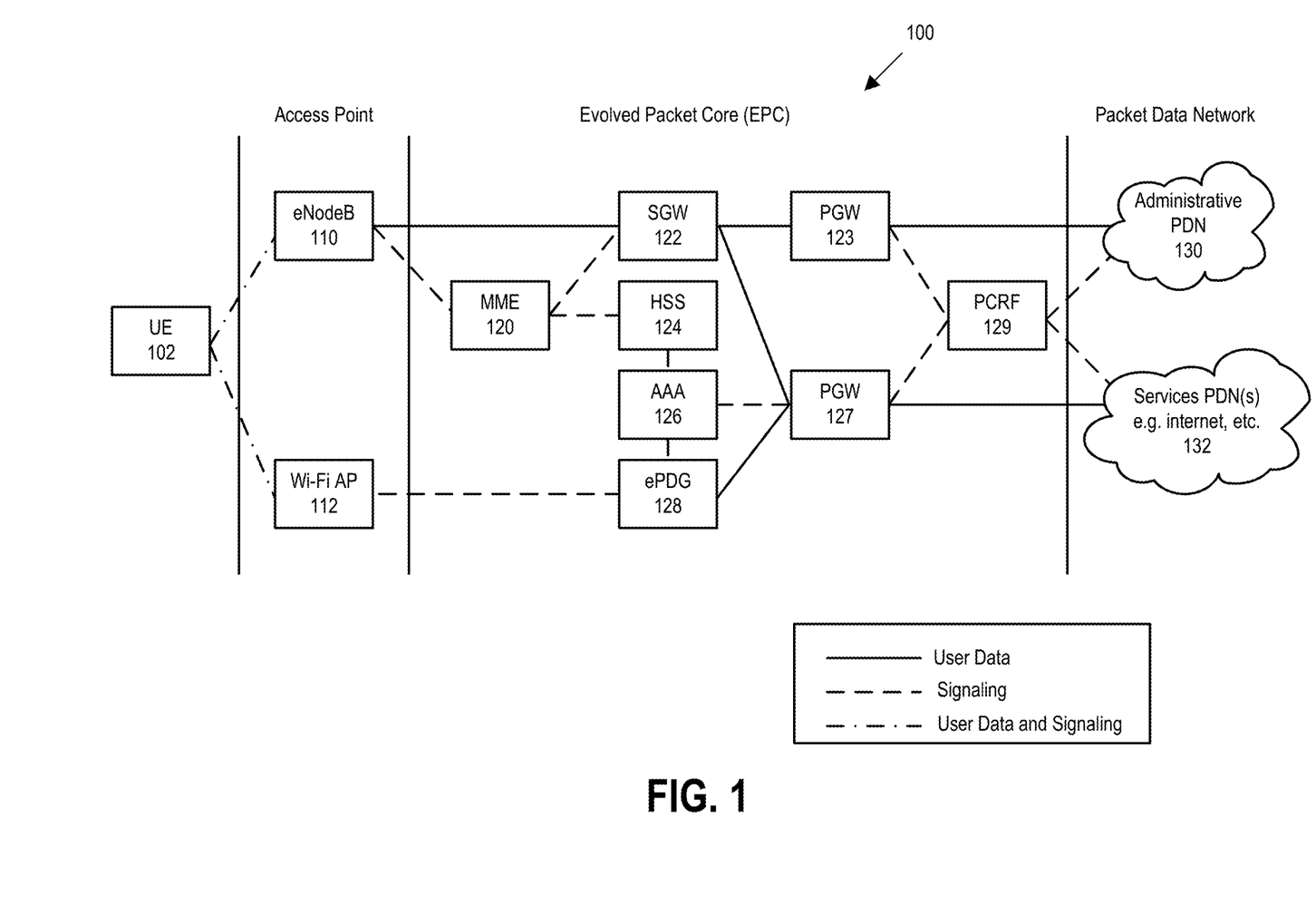
FIG. 1 illustrates an exemplary network architecture to which systems and methods in accordance with embodiments can be applied.

FIG. 1 is a simplified diagram illustrating an exemplary telecommunication network architecture 100 to which embodiments of systems and methods of the present invention can be applied to identify issues affecting subscribers and identify potential commonalities to the identified issues. As shown, the architecture is based on System Architecture Evolution (SAE), which is the core network architecture of 3GPP's LTE wireless communication standard. However, it is noted that embodiments of systems and methods of the present invention can also be applied to other architectures including future generation architectures.

The SAE architecture is a packet-based network architecture with separate control plane and user plane traffic. A user can connect to a network via a user equipment (UE) 102, such as a cell phone or other wireless device, by connecting to an element of the SAE architecture called an evolved node B (eNodeB) 110. An example of an eNodeB is a base transceiver station (BTS) in a GSM network. The eNodeB provides the packets received from the UE to the main component of the SAE architecture—the evolved packet core (EPC). A UE can also interact with a network via some other access point, such as a Wi-Fi access point 112.

The EPC includes several subcomponents some of which are shown in FIG. 1. A mobility management entity (MME) 120 subcomponent is responsible for choosing a serving gateway (SGW) 122 for a UE. The MME is responsible for authenticating a user via a home subscriber server (HSS) 124, which is a central database that contains user-related and subscription-related information. The MME is also the key control-node responsible for idle mode UE paging and tagging procedure including retransmissions and also provides the control plane function for mobility between LTE and 2G/3G access.

The SGW routes and forwards user data packets, while also acting as the mobility anchor for the user plane during inter-eNodeB handovers and as the anchor for mobility between LTE and other 3GPP technologies.

A packet data network gateway (PGW) 123, 127 provides connectivity from the UE to external packet data networks (PDNs) 130, 132 by being the point of exit and entry of traffic for the UE. The PGW performs packet filtering for each user and charging support, and can act as an anchor for mobility between 3GPP and non-3GPP technologies.

Other subcomponents include a policy and charging rules function (PCRF) module 129 that supports service data flow detection, policy enforcement and flow-based charging, an evolved packet data gateway (ePDG) 128 that secures data transmission with a UE connected to the EPC over an untrusted non-3GPP access (e.g., the Wi-Fi access point), and an authentication, authorization, and accounting (AAA) module 126 for intelligently controlling access to computer resources, enforcing policies, auditing usage, and providing the information necessary to bill for services.

As will be appreciated, each of the modules and subcomponents of a network can be potential sources of faults and other performance issues. Service assurance for networks requires many tasks, including fault management, root cause analysis, performance monitoring and alarming, traffic trending and congestion control. These tasks aim to improve service availability and perceived quality in order to improve the customer experience of services delivered.

Data related to network performance can be extracted from various sources including network elements, such as described above in FIG. 1, probes, sensors, log files and even from social networks. Currently, tools such as eoLive available from ANRITSU® can be used to generate key performance indicators (KPIs) from the collected data and to present the KPIs to a user via a computer interface to provide a real-time view of customer experience of services to an individual interacting with the interface. The network operator can assure service performance by using such tools to maintain the service, respond in a timely fashion and resolve customer or network triggered problems, and track, report, manage and take action to improve performance for various aspects of the service.

Tools such as eoLive can be applied to detect network problems by identifying issues and classifying them. For example, such tools can classify issues as interconnection, congestion, logical or physical error, in order to pass them to the correct department and to provide an overall reduction of mean time to repair (MTTR), i.e., the time needed to fix a network issue that can cause a service outage or service degradation. Taking too long to resolve an issue can erode revenue coming from that service and, in the long term, increase customer dissatisfaction due to service unavailability.

However, the data that is currently being collected and accumulated is growing more quickly in volume than it can be analyzed. One of the biggest challenges for a telecommunication network operator today is making use of the huge amounts of data available to management, operations, marketing, engineering and customer care in order to understand QoE for subscribers. It can be difficult to identify issues within the large pool of available data in a short period of time.

Big data in telecommunication networks is characterized by the large volumes of data (often many billions of event records per day are generated) and the many varieties of that data (e.g., the different interfaces, network and application technologies that are monitored). Because the volume of data is so large—and due to the complexity of the content of the data—analysis has been difficult and costly, leading to a frustrating execution gap between what the network operator wants to achieve with the data, and the tools and technologies sitting between the network operator and that goal.

Previous attempts to develop systems to analyze collected data involved a complicated and cumbersome process of gathering source data, extracting the source data, enriching the extracted data, loading the enriched data into a database (i.e., extract, transform and load (ETL)) and then presenting this information in some form of reporting tool at the top layer. A specialist would use this set of tools to derive insights. This often leads to data warehouses being used for a very limited number of functions, and often serving a limited number of users in the organization, i.e. those users represented by a limited set of experts who understand and have access to the reporting tools at the top layer. Data is often left lying dormant, and opportunities for improved service, cost, and customer retention are thereby lost.

Embodiments of systems and methods in accordance with the present invention can be used to provide insights inside data streams to identify issues that affect customers and also to respond to threats and opportunities for service delivery. Such embodiments can take advantage of opportunities for improved service, cost and customer retention.

In accordance with embodiments, systems and methods in accordance with the present invention can apply a continuous process of extraction of information to maximize the investment in data sources to thereby improve subscriber QoE and network robustness. Such embodiments can be useful for network operators who need to analyze huge amount of data coming from their network. For example, operational executives can benefit from key insights that impact the performance of the network and subscriber experiences, tactical officers can benefit from the ability to identify issues and possible causes without specialist involvement, and financial executives can benefit from real time analysis—leveraging a streaming analytics technique that can provide results more quickly than previous techniques for analyzing data.

In accordance with an embodiment, a systems and method can apply devices and tools within an infrastructure and techniques for processing data obtained from such devices and tools that collectively will be referred to herein as subscribers impacted and root cause analysis ("SIRCA"). SIRCA can be used to obtain data, generate key process indicators (KPIs) and apply data science and machine learning investigation patterns to improve the identification and resolution of immediate and ongoing issues and faults.

A systems and method can apply SIRCA to provide real-time classification that aims to identify flare-ups of issues affecting subscribers, and attempts to identify commonality between these issues. SIRCA relies on real-time streaming aggregation of distinct subscribers affected by issues and provides alarms driven by self-learning thresholds by means of outlier detection. In addition to the data gathering infrastructure, SIRCA can provide an interface accessible to individuals within the organization of a network operator. In one embodiment, the interface can be a social network style user interface (UI) for example that can take advantage of user subscription and a wall on which posts, news feeds, comments, etc. can be displayed. SIRCA can provide root cause analysis with real-time trending, recurrence detection and cross-interface case correlation.

Figure 2:
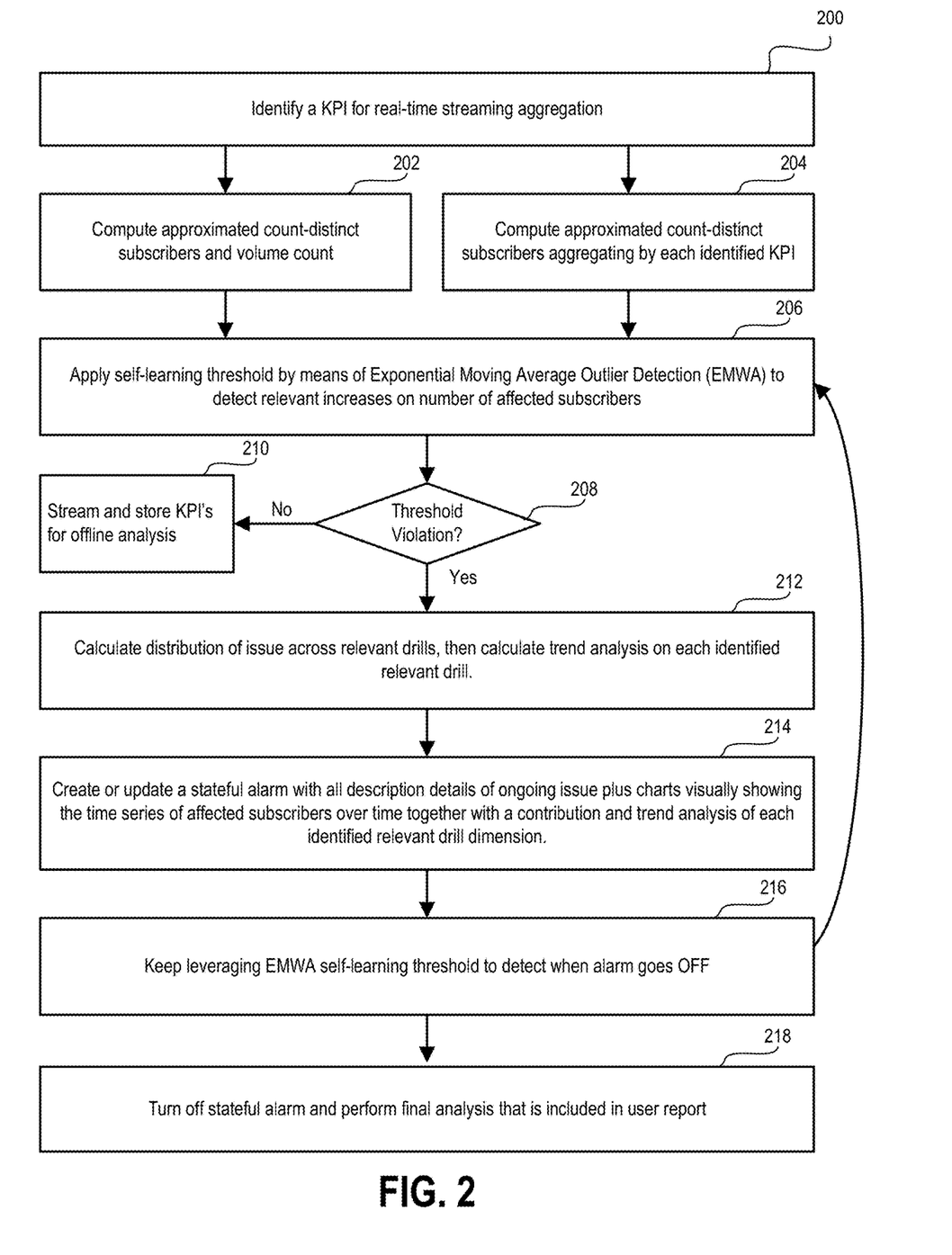
FIG. 2 is a flowchart for a method of identifying an issue for use with a system using data obtained by the system, in accordance with an embodiment.

FIG. 2 is a flowchart for a method of identifying an issue within data obtained by a system using SIRCA, in accordance with embodiments of the system and method. The method includes identifying a KPI for real-time streaming aggregation (Step 200). The identified KPI is applied during analysis of streaming data records. The method can leverage big data streaming analytics engines (e.g., Apache Storm event processor) to provide full horizontal scalability in real-time data processing by in-memory only aggregation and analysis, without need of storage of original records. Original data is not stored, by rather can be analyzed on the fly while read from data sources.

Figure 3:
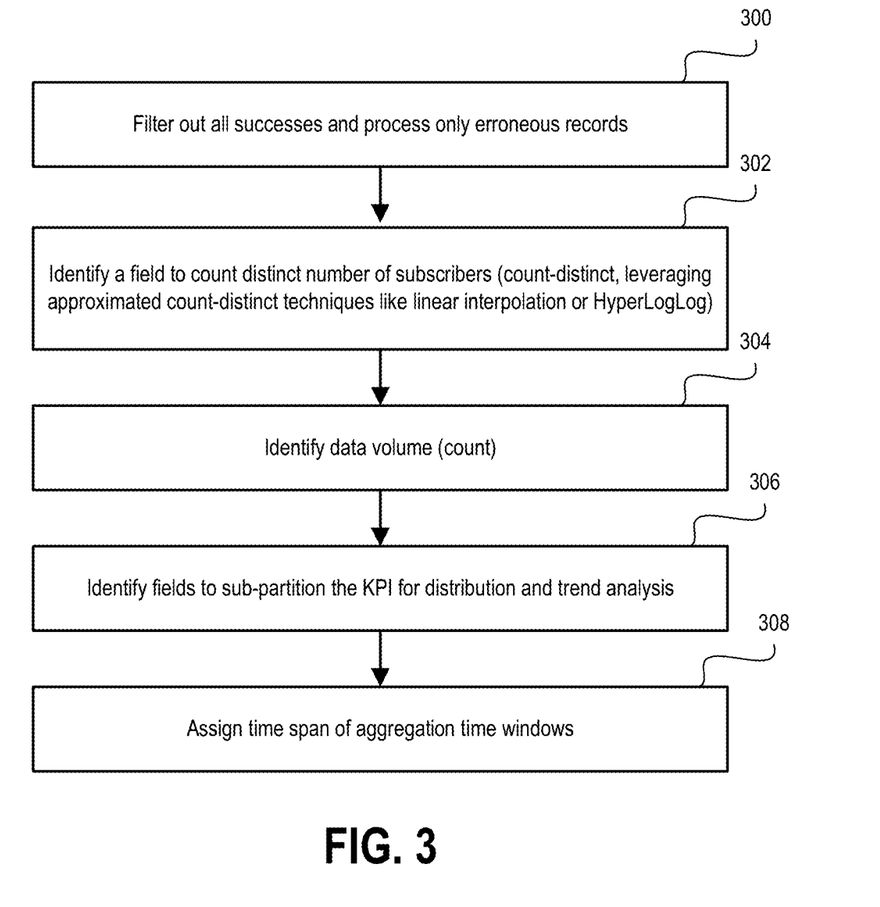
FIG. 3 is a flowchart for identifying a key process indicator (KPI) for real-time streaming aggregation, in accordance with an embodiment.

FIG. 3 is a flowchart for identifying a KPI for real-time streaming aggregation, in accordance with an embodiment. A KPI is identified (or defined) by an input filter step where all successes are filtered out and only erroneous records are processed (Step 300). An aggregation formula is then generated by identifying a field to count a distinct number of subscribers (Step 302). The number of subscribers are count-distinct, leveraging approximated count-distinct techniques like linear interpolation or HyperLogLog, for example. A volume aggregation formula is then generated by identifying data volume (count) (Step 304). Aggregation keys are then generated by identifying fields to sub-partition the KPI for distribution and trend analysis (Step 306). Finally, aggregation granularity is determined by specifying a time span of aggregation time windows (e.g., 1 minute, 15 seconds) (Step 308).

Referring again to FIG. 2, count-distinct subscribers and volume count are approximated (Step 202). Count-distinct subscribers are also approximated, aggregating by each identified KPI (Step 204).

In accordance with an embodiment, data records are aggregated in real-time in memory by a scalable directed acyclic graph (DAG). The pipeline feedback, when needed, can be achieved by leveraging distributed synchronization and group services software (e.g. Apache ZooKeeper). Aggregation output (i.e., KPI data) is then analyzed at each time window closure.

Real time trending records are kept in memory for each drill object found in data records so that baseline averages are always known. If a relevant increase in errors is spotted, it is possible to analyze deviation of each single drill object that contributed to the increase. Real time trending is achieved by means of exponential moving average (EMA). By leveraging standard exponential weighted moving average (EWMA) outlier detection, a self-learning threshold analyzes the main error count for each KPI (Step 206).

If a current value is within an allowed range (i.e., there is no threshold violation (Step 208)), the base KPI data (i.e., the count-distinct number of subscribers experiencing the issue in this time frame) is forwarded to a KPI storage component for later use (Step 210). SIRCA uses the full time series for the UI and also for data science features, such as recurrence detection, auto-correlation and long-range trend analysis. The UI can display charts showing full time series of KPI values in a time range, including not only erroneous time range.

If instead the current value is identified as an outlier (i.e., is a threshold violation (Step 208)), a stateful case-report is open. The real-time analysis leverages the real time trending records kept in memory for each drill object to not only have an immediate picture of the most contributing ones, but moreover to assess their individual deviation that brought the outage (Step 212). Drill impact score is also calculated. Impact score is a scalar summary measure (e.g. in the range 0-5) of how much each drill dimension impacted in/to the specific issue. Impact score is calculated by means of weighted and trended rate of drill error deviation/overall error deviation, at the moment of the outage.

The full case report details can be forwarded to the backend and storage component to be stored and displayed in the main UI and propagated as alarms (if configured to do so) (Step 214). The aggregation analysis component then keeps checking subsequent values of KPI to keep stateful case report up to date. As long as outlier detection reports error, the case report is updated (Step 216). When outlier detection goes off, the case report is considered as closed, and information about closure is propagated again to backend for storage and UI (Step 218).

Recurrence detection and automatic case correlation are analysis tasks performed at case closure. Recurrence detection leverages the backend KPI and case-report storage to provide a user with information about the following questions: How many times did this kind of issue happen in the past 24 hours? Is this happening on a daily basis? Is this happening on a weekly basis?

Automatic case correlation can be applied to find correlated cases with a specific case by analyzing all available SIRCA cases during the same time interval as the main case and looking for common objects in the most relevant drills. Correlated case reports can be displayed in the UI in a dedicated chart or table to give a user an overview of correlated issues happened in concurrency in its system.

Failures per second (FPS) can also be reported and trended in the UI dedicated to case report analysis. The average number of failed attempts volume per subscriber is compared to previous values to assess if there is an increase or decrease in the number of error retries performed by active subscribers.

Embodiments of systems and method in accordance with the present invention look for negative event clouds—issues that are affecting a certain amount of users—and then tries to look for common 'co-occurrence' features in the source data. When a cluster of users where a problem is taking place is detected, embodiments attempt to automatically identify the common factors in the event. Such analysis can typically take an individual on the order of 15 minutes of slicing and dicing in a suitably powerful business intelligence tool. This type of analysis can be performed continuously on all data sources.

In accordance with an embodiment, the UI is a social network-like, mobile-ready web interface where each user has a private account used to login into the software. A user can customize the channels he or she is interested to receive posts and notifications from, for example, each SIRCA instance running on specific protocol or group of subscribers (e.g. VIP groups) belonging to a channel.

In accordance with an embodiment, a main window can display one or more of a news ticker on statistics about case-reports, monthly/weekly overview of case-reports over time, and a list of posts. A user can receive case-reports like posts in the web UI main window. Each post can be displayed as a summary text of a case-report, describing when and what happened, how many subscribers are/were affected and a mini-chart visually showing the time series highlighting the violation period.

Each post can be dismissed so that a user will receive no more notifications regarding the same case-report. Each post can be 'starred' so that other users can see who 'starred' a post. Each post can be commented on, with all users having access to read other users comment on a post. Further, a post-and-broadcast feature is available to not only add a comment, but also broadcast the post to all users, even if they are not subscribed to that channel.

Figure 4:
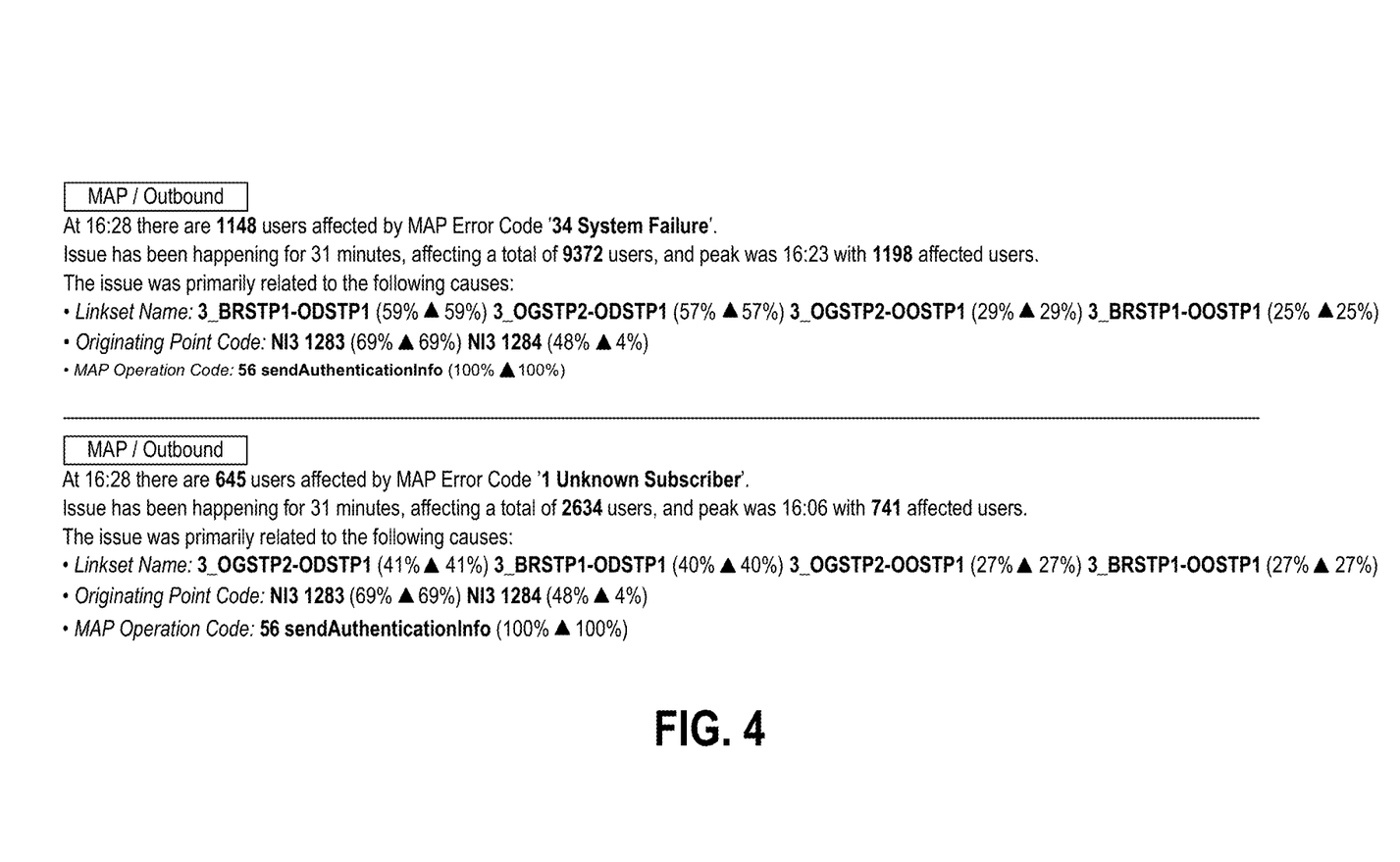
FIGS. 4 and 5 are examples of output generated by systems and methods in accordance with embodiments.
Figure 5:
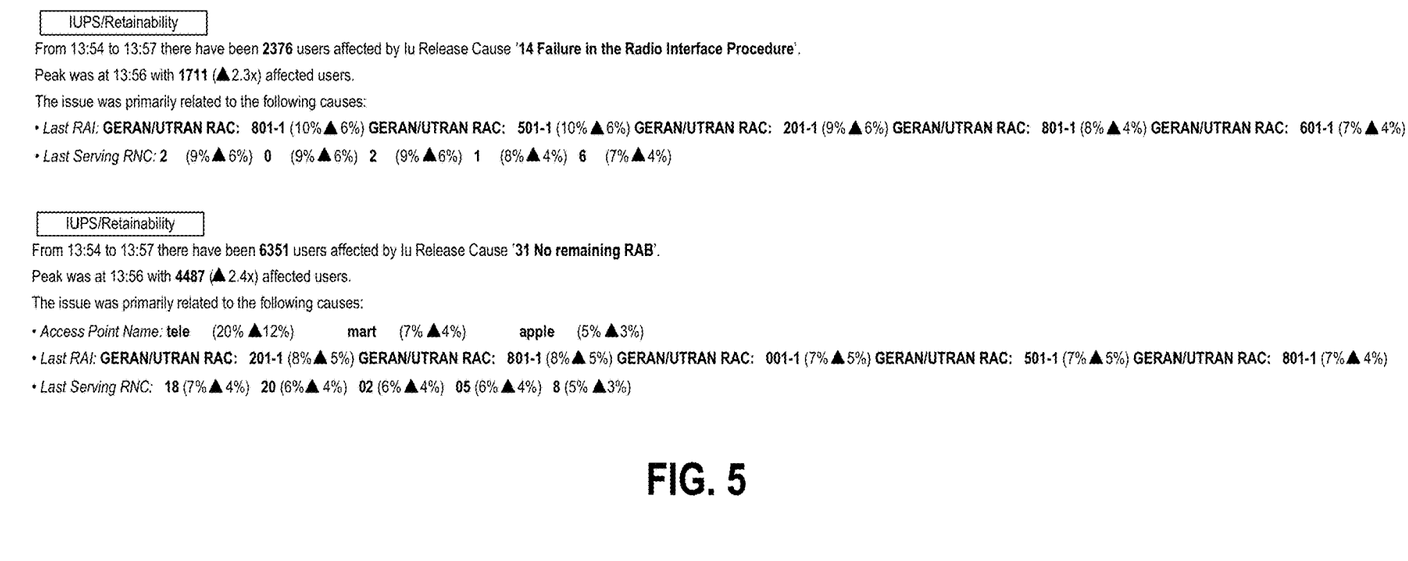

FIGS. 4 and 5 illustrates examples of output generated by systems and methods in accordance with embodiments. Such output can appear on a post and is completely human-readable, enabling a user to immediately understand what issues are being communicated and then decide, for example, whether you like the post and want to take a further action, or whether you want to suppress it (i.e., to unfollow the thread)

FIG. 4 shows two findings posted to a user's wall. The first finding shows an issue with MAP (roaming) interconnect records, where a spike of 1,148 individual subscribers are being affected by a roaming error. FIG. 5 shows common co-occurrence features identified by the system and method, and the root causes the system thinks might be. Trends are displayed for each possible cause, as well as a list of them. By observing the post, a user can quickly tell what is likely to be related to the cause of the problem.

Figure 6:
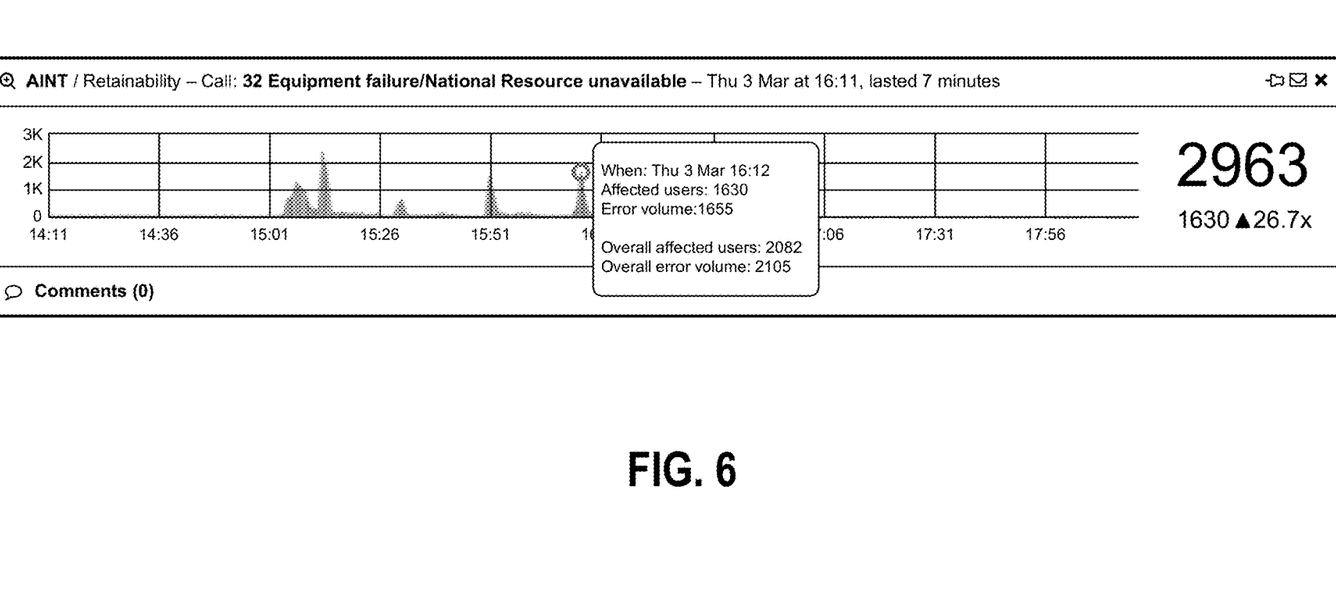
FIG. 6 is an example of a case-report summary generated by systems and methods in accordance with embodiments.
Figure 7:
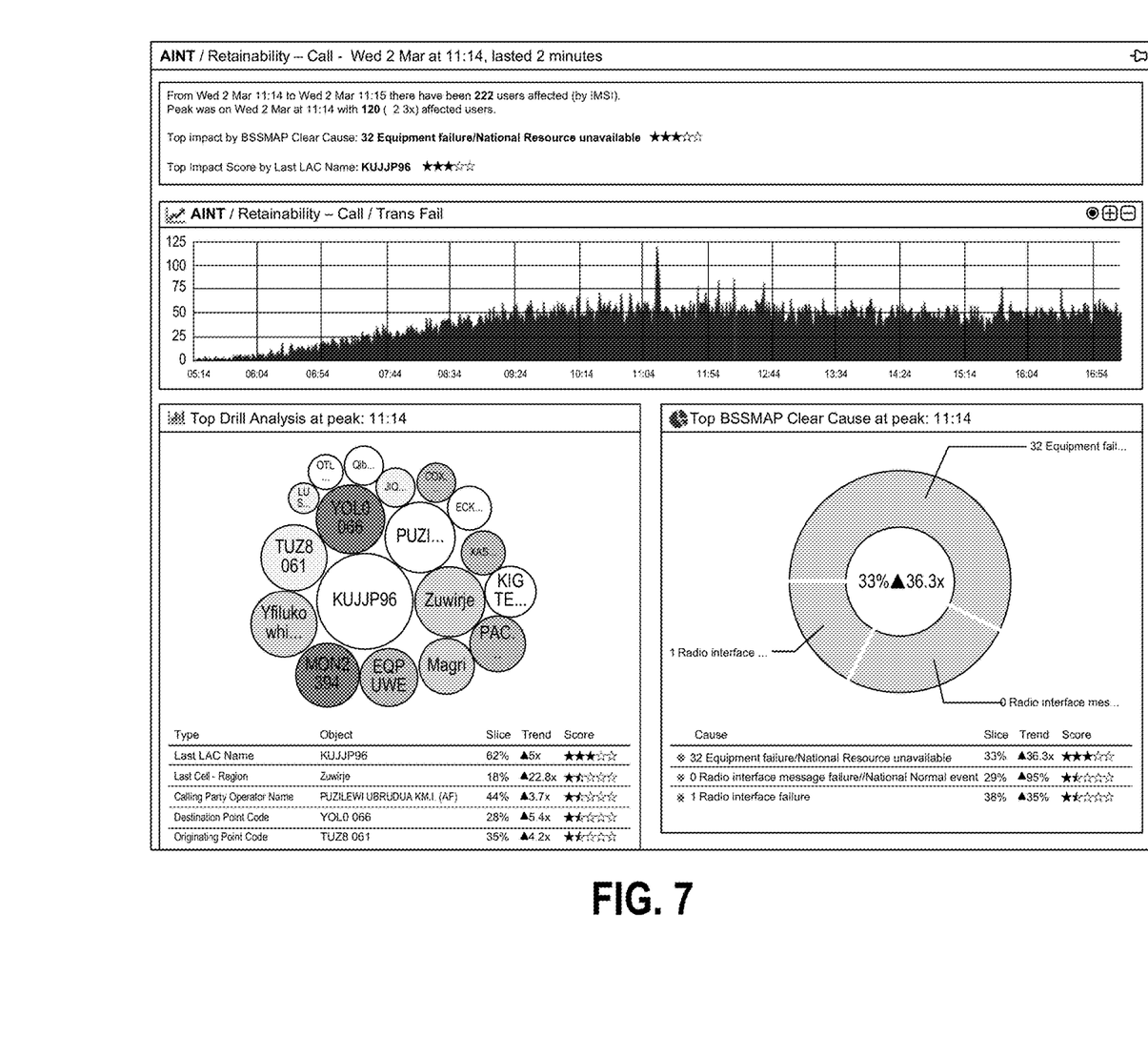
FIG. 7 is an example of a case-report analysis generated by systems and methods in accordance with embodiments.

In accordance with an embodiment, in the main window of the UI it is possible to view an overview of a SIRCA case. FIG. 6 is an example of a case report summary view shown in a main UI for each case found. In an embodiment, a dedicated "analyze" button is available to open a dedicated analysis page where all details and information about the case can be reviewed and analyzed. FIG. 7 is an example of a case report analysis, with the UI providing a dedicated page/view providing full analysis of a single case report. The details and information can include case-report description and information, a full chart showing time series of numbers of impacted subscribers over time, bubble-chart or pie-chart and table showing the most relevant drill analysis results, recurrence analysis results and correlated cases chart and table.

Still further, it is possible to share a case-report by sending a web link to an email address. A user is also allowed to export a time series of impacted subscribers to a format for transferring the data for analysis, such as a comma separated values (CSV) file format. It is also possible to open an external data discovery tool (e.g. Tableau), to follow up with a slice-and-dice investigation of the issue.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The previous description of the preferred embodiments is provided to enable any person skilled in the art to make or use the embodiments of the present invention. While the invention has been particularly shown and described with reference to preferred embodiments thereof, it will be understood by those skilled in the art that various changes in form and details may be made therein without departing from the spirit and scope of the invention.

The invention claimed is:

1. A method for identifying issues within a telecommunication network, the method comprising:
   identifying a plurality of key performance indicators (KPIs) for real-time streaming aggregation;
   partitioning each of the plurality of KPIs into a plurality of drill objects;
   using a plurality of probes installed within the telecommunication network to generate streaming data related to performance of the telecommunication network;
   filtering successful records out of the streaming data so that only streaming error data is processed;
   identifying a field in the streaming error data to count a distinct number of subscribers;
   identifying streaming error data volume; and
   specifying a time span of aggregation time windows to determining aggregation granularity;
   aggregating, in real-time, error data for each of the plurality of drill objects for each of the plurality of KPIs, from the streaming data generated by the plurality of probes
   storing aggregated error data in a scalable directed acyclic graph (DAG) for each of the plurality of drill objects for each of the plurality of KPIs;
   calculating, using the aggregated error data, an approximation of count-distinct subscribers and data volume count (main error count) for each of the plurality of KPIs;
   generating and storing real-time trending records for each of the plurality of drill objects using an exponential moving average;
   generating baseline averages error counts based on the real-time trending records for each of the plurality of KPIs;
   detecting an increase in errors related to a particular KPI of the plurality of KPIs by comparing the main error count (including the approximation of count distinct subscribers and data volume count) to the baseline average error counts for each particular KPI of the of the plurality of KPIs; and
   in response to detecting the increase in errors related to the particular KPI,
      analyzing deviations in each drill object of the particular KPI contributing to the detected increase in errors,
      generating a full case report based on details of the deviations in each drill object of the particular KPI contributing to the detected increase in errors, the full case report to be displayed in a user interface, and propagating one or more alarms related to the deviations.

2. The method of claim 1, wherein detecting an increase in errors related to a particular KPI of the plurality of KPIs by comparing the main error count to the baseline average error counts comprises:
calculating a self-learning threshold set by exponential weighted moving average outlier detection, and comparing the self-learning threshold with the main error count (including the approximation of count distinct subscribers and data volume count) for each of the plurality of KPIs.

3. The method of claim 1, wherein analyzing deviations in each drill object of the particular KPI contributing to the detected increase in errors comprises:
determining which drill object contributed most to the detected increase in errors.

4. The method of claim 1, further comprising:
posting the full case report so that the full case report is accessible to a user via a user interface.

5. The method of claim 4, wherein the full case report is posted to a wall accessible to a user that subscribes to a case report type associated with the full case report.

6. The method of claim 1, further comprising:
updating the full case report by checking a subsequent main error count value for the particular KPI; and
performing recurrence detection and automatic case correlation on data related to particular KPI for which the full case report was generated and updated.

7. The method of claim 1, wherein analyzing deviations in each drill object of the particular KPI contributing to the detected increase in errors comprises:
calculating an impact score for each drill object based on a weighted and trended rate of drill error deviation and/or overall error deviation.

8. The method of claim 1, wherein analyzing deviations in each drill object of the particular KPI contributing to the detected increase in errors comprises:
calculating an impact score for each drill object based on a weighted and trended rate of drill error deviation and/or overall error deviation; and
determining which drill object contributed most to the detected increase in errors.

9. The method of claim 1, wherein:
detecting an increase in errors related to a particular KPI of the plurality of KPIs by comparing the main error count (including the approximation of count distinct subscribers and data volume count) to the baseline averages uses exponential weighted moving average (EWMA) outlier detection.

10. The method of claim 1, further comprising:
checking a subsequent main error count value for the particular KPI; and
closing the full case report if an increase in errors is no longer detected.

11. A non-transitory computer readable media comprising instructions stored thereon for identifying issues within a telecommunication network, which instructions, when executed by a computer, cause the computer to perform steps comprising:
identifying a plurality of key performance indicators (KPIs) for real-time streaming aggregation;
partitioning each of the plurality of KPIs into a plurality of drill objects;
using a plurality of probes installed within the telecommunication network to generate streaming data related to performance of the telecommunication network;
filtering successful records out of the streaming data so that only streaming error data is processed;
identifying a field in the streaming error data to count a distinct number of subscribers;
identifying streaming error data volume; and
specifying a time span of aggregation time windows to determining aggregation granularity;
aggregating, in real-time, error data for each of the plurality of drill objects for each of the plurality of KPIs, from in the streaming data generated by the plurality of probes
storing aggregated error data in a scalable directed acyclic graph (DAG) for each of the plurality of drill objects for each of the plurality of KPIs;
calculating, using the aggregated error data, an approximation of count-distinct subscribers and data volume count (main error count) for each of the plurality of KPIs;
generating and storing real-time trending records for each of the plurality of drill objects using an exponential moving average;
generating baseline averages error counts based on the real-time trending records for each of the plurality of KPIs;
detecting an increase in errors related to a particular KPI of the plurality of KPIs by comparing the main error count (including the approximation of count distinct subscribers and data volume count) to the baseline average error counts for each particular KPI of the of the plurality of KPIs; and
in response to detecting the increase in errors related to the particular KPI,
analyzing deviations in each drill object of the particular KPI contributing to the detected increase in errors,
generating a full case report based on details of the deviations in each drill object of the particular KPI contributing to the detected increase in errors, the full case report to be displayed in a user interface, and
propagating one or more alarms related to the deviations.

12. The non-transitory computer readable media of claim 11, wherein detecting an increase in errors related to a particular KPI of the plurality of KPIs by comparing the main error count to the baseline averages comprises:
calculating a self-learning threshold set by exponential weighted moving average outlier detection, and comparing the self-learning threshold with the main error count for each of the plurality of KPIs.

13. The non-transitory computer readable media of claim 11, wherein analyzing deviations in each drill object of the particular KPI contributing to the detected increase in errors comprises:
determining which drill object contributed most to the detected increase in errors.

14. The non-transitory computer readable media of claim 11, wherein the steps further comprise:
updating the full case report by checking a subsequent main error count value for the particular KPI; and
performing recurrence detection and automatic case correlation on data related to particular KPI for which the full case report was generated and updated.

15. The non-transitory computer readable media of claim 11, wherein analyzing deviations in each drill object of the particular KPI contributing to the detected increase in errors comprises:

calculating an impact score for each drill object based on a weighted and trended rate of drill error deviation and/or overall error deviation; and determining which drill object contributed most to the detected increase in errors.

16. The non-transitory computer readable media of claim 11, wherein:

detecting an increase in errors related to a particular KPI of the plurality of KPIs by comparing the main error count to the baseline averages uses exponential weighted moving average (EWMA) outlier detection.

17. The non-transitory computer readable media of claim 11, wherein the steps further comprise:

checking a subsequent main error count value for the particular KPI; and closing the full case report if an increase in errors is no longer detected.

18. A system for identifying issues within a telecommunication (telecom) network comprising:

a plurality of probes installed within the telecom network, and an analysis tool comprising a processor and a memory, wherein the analysis tool is configured to perform steps comprising:

identifying a plurality of key performance indicators (KPIs) for real-time streaming aggregation;

partitioning each of the plurality of KPIs into a plurality of drill objects;

using a plurality of probes installed within the telecommunication network to generate streaming data related to performance of the telecommunication network;

filtering successful records out of the streaming data so that only streaming error data is processed;

identifying a field in the streaming error data to count a distinct number of subscribers;

identifying streaming error data volume; and specifying a time span of aggregation time windows to determining aggregation granularity;

aggregating, in real-time, error data for each of the plurality of drill objects for each of the plurality of KPIs, from in the streaming data generated by the plurality of probes storing aggregated error data in a scalable directed acyclic graph (DAG) for each of the plurality of drill objects for each of the plurality of KPIs;

calculating, using the aggregated error data, an approximation of count-distinct subscribers and data volume count (main error count) for each of the plurality of KPIs;

generating and storing real-time trending records for each of the plurality of drill objects using an exponential moving average;

generating baseline averages error counts based on the real-time trending records for each of the plurality of KPIs;

detecting an increase in errors related to a particular KPI of the plurality of KPIs by comparing the main error count (including the approximation of count distinct subscribers and data volume count) to the baseline average error counts for each particular KPI of the of the plurality of KPIs; and in response to detecting the increase in errors related to the particular KPI, analyzing deviations in each drill object of the particular KPI contributing to the detected increase in errors, generating a full case report based on details of the deviations in each drill object of the particular KPI contributing to the detected increase in errors, the full case report to be displayed in a user interface, and propagating one or more alarms related to the deviations.

19. The system of claim 18, wherein detecting an increase in errors related to a particular KPI of the plurality of KPIs by comparing the main error count to the baseline averages comprises:

calculating a self-learning threshold set by exponential weighted moving average outlier detection, and comparing the self-learning threshold with the main error count for each of the plurality of KPIs.

20. The system of claim 18, wherein analyzing deviations in each drill object of the particular KPI contributing to the detected increase in errors comprises:

determining which drill object contributed most to the detected increase in errors.

21. The system of claim 18, configured to perform steps further comprising:

updating the full case report by checking a subsequent main error count value for the particular KPI; and performing recurrence detection and automatic case correlation on data related to particular KPI for which the full case report was generated and updated.

22. The system of claim 18, wherein analyzing deviations in each drill object of the particular KPI contributing to the detected increase in errors comprises:

calculating an impact score for each drill object based on a weighted and trended rate of drill error deviation and/or overall error deviation; and determining which drill object contributed most to the detected increase in errors.

23. The system of claim 18, wherein:

detecting an increase in errors related to a particular KPI of the plurality of KPIs by comparing the main error count to the baseline averages uses exponential weighted moving average (EWMA) outlier detection.

24. The system of claim 18, configured to perform steps further comprising:

checking a subsequent main error count value for the particular KPI; and closing the full case report if an increase in errors is no longer detected.

* * * * *